(12) United States Patent
Pitre et al.

(10) Patent No.: US 12,100,824 B2
(45) Date of Patent: Sep. 24, 2024

(54) BATTERY MODULE WITH THERMAL MANAGEMENT SYSTEM

(71) Applicant: Lilium eAircraft GmbH, Wessling (DE)

(72) Inventors: Ryan Pitre, Wessling (DE); Angel Plaza, Wessling (DE); Joerg-Michael Weber, Wessling (DE); Gerd Fritsch, Gilching (DE); Felix Scheile, Wessling (DE); Armin Ader, Wessling (DE); Axel Dietrich, Gilching (DE)

(73) Assignee: Lilium eAircraft GmbH, Wessling (DE)

( * ) Notice: Subject to any disclaimer, the term of this patent is extended or adjusted under 35 U.S.C. 154(b) by 0 days.

(21) Appl. No.: 17/672,018

(22) Filed: Feb. 15, 2022

(65) Prior Publication Data

US 2022/0271369 A1     Aug. 25, 2022

(30) Foreign Application Priority Data

Feb. 19, 2021  (EP) ..................................... 21158218
Feb. 4, 2022   (WO) ................. PCT/EP2022/052725

(51) Int. Cl.
*H01M 10/6568*     (2014.01)
*H01M 10/613*      (2014.01)
(Continued)

(52) U.S. Cl.
CPC ..... *H01M 10/6568* (2015.04); *H01M 10/613* (2015.04); *H01M 10/625* (2015.04);
(Continued)

(58) Field of Classification Search
CPC ..................... H01M 10/60–667; H01M 50/367
See application file for complete search history.

(56) References Cited

U.S. PATENT DOCUMENTS 11,757,142 B2 *  9/2023  Buck ................. H01M 10/6555
                                               429/120
2009/0301700 A1 * 12/2009 German ............... B29C 66/301
                                               165/160

(Continued)

FOREIGN PATENT DOCUMENTS

CN       112259852 A       1/2021
WO    WO-2019233956 A1 * 12/2019 .............. B60L 50/64

OTHER PUBLICATIONS

European Search Report for EP 21 158 218.4. 8 pages. Mailed Jul. 15, 2021.

(Continued)

*Primary Examiner* — Scott J. Chmielecki
(74) *Attorney, Agent, or Firm* — Meunier Carlin & Curfman LLC

(57) ABSTRACT

A battery module for a vehicle, in particular for an aircraft, comprises a housing, a cell stack accommodated in the housing, an internal channel system for heat transfer fluid disposed in the housing, a fluid inlet connector and a fluid outlet connector connected to the internal channel system and adapted to being connected to an external thermal management system, wherein the fluid inlet connector and the fluid outlet connector are self-sealing connectors molded into the housing, preferably self-sealing and dripless connectors.

11 Claims, 4 Drawing Sheets

(51) Int. Cl.
  *H01M 10/625* (2014.01)
  *H01M 10/647* (2014.01)
  *H01M 10/653* (2014.01)
  *H01M 10/6556* (2014.01)
  *H01M 50/211* (2021.01)
  *H01M 50/249* (2021.01)
  *H01M 50/317* (2021.01)

(52) U.S. Cl.
  CPC ....... *H01M 10/647* (2015.04); *H01M 10/653* (2015.04); *H01M 10/6556* (2015.04); *H01M 50/211* (2021.01); *H01M 50/249* (2021.01); *H01M 50/317* (2021.01); *H01M 2220/20* (2013.01)

(56) References Cited

U.S. PATENT DOCUMENTS

| | | | |
|---|---|---|---|
| 2018/0205045 A1* | 7/2018 | Schröder | H01M 50/264 |
| 2019/0181518 A1* | 6/2019 | Siering | H01M 10/613 |
| 2019/0221900 A1 | 7/2019 | Shen et al. | |
| 2019/0245175 A1* | 8/2019 | Qin | H01M 50/24 |
| 2019/0296408 A1* | 9/2019 | Itai | H01M 10/6565 |
| 2019/0315217 A1* | 10/2019 | Hohm | B62D 25/20 |
| 2020/0161729 A1* | 5/2020 | Kim | H01M 10/6569 |
| 2021/0057708 A1* | 2/2021 | Castillo | B60L 50/66 |
| 2021/0083340 A1 | 3/2021 | Gao | |
| 2021/0226279 A1* | 7/2021 | Fröhlich | H01M 50/224 |
| 2022/0123424 A1* | 4/2022 | Wu | H01M 50/342 |
| 2022/0131209 A1* | 4/2022 | Bartling | H01M 10/613 |
| 2022/0285761 A1* | 9/2022 | Fang | H01M 10/613 |
| 2024/0055689 A1* | 2/2024 | Al-Zareer | H01M 10/6568 |
| 2024/0106027 A1* | 3/2024 | Shin | H01M 10/647 |

OTHER PUBLICATIONS

International Search Report and Written Opinion issued for Application No. PCT/EP2022/052725, dated May 11, 2022.

* cited by examiner

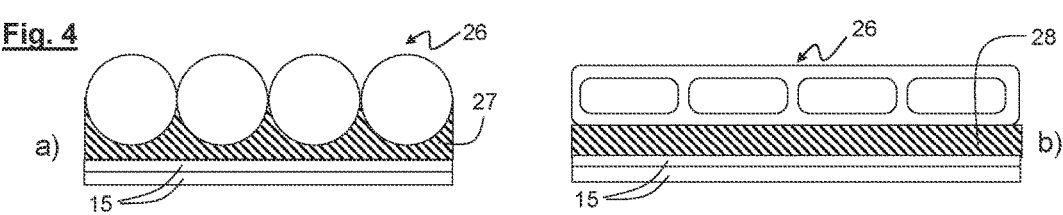
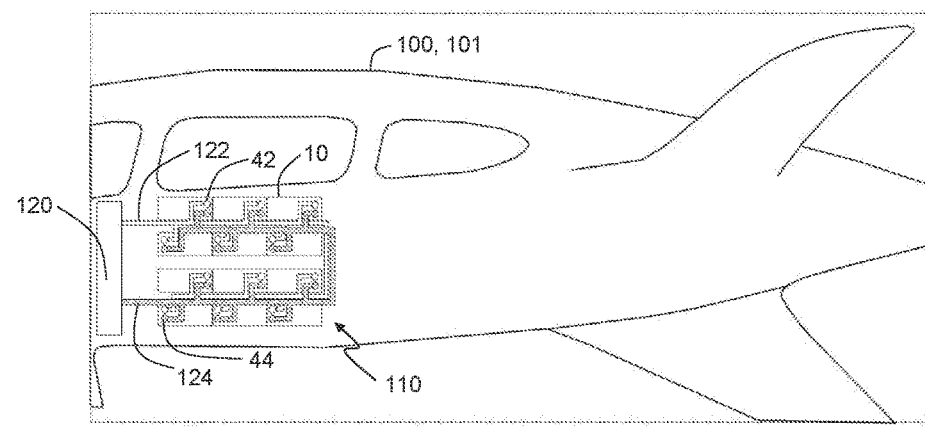

BATTERY MODULE WITH THERMAL MANAGEMENT SYSTEM

The present invention relates to a battery module for a vehicle, in particular for an aircraft. Thermal management is an important issue in this field as the performance of rechargeable batteries is very sensitive to temperature. For safety reasons, in particular overheating has to be prevented as some rechargeable batteries such as Li-ion batteries are prone to thermal runaway.

To be more precise, the present invention relates to a battery module comprising a housing, a cell stack accommodated in the housing, an internal channel system for a heat transfer fluid disposed in the housing, a fluid inlet connector and a fluid outlet connector connected to the internal channel system and adapted to being connected to an external thermal management system.

Such battery modules are known e.g. from WO 2016/131141 A1. Installing these battery modules and connecting them to or disconnecting them from the thermal management system is however rather complicated and takes a lot of time as the entire thermal management system has to be drained before a battery module can be exchanged.

Against this background, the object of the invention is to adapt the known battery modules in such a manner, that the process of exchanging a battery module can be simplified.

In order to solve this problem, according to the invention, the fluid inlet connector and the fluid outlet connector are self-sealing connectors molded into the housing. Preferably they are self-sealing and dripless connectors.

Fluid lines for connecting the internal channel system to the fluid inlet connector and the fluid outlet connector can also be molded into the housing.

Using self-sealing connectors and corresponding self-sealing counter-connectors provided on the side of the thermal management system allows to hot-swap the battery modules, i.e. to exchange the battery modules without having to drain the system beforehand.

In this context, a self-sealing connector incorporates a valve that automatically closes when the connector is disconnected from the corresponding counter-connector. Nevertheless, depending on the form of the valves in the connector and the corresponding counter-connector, a few drops of heat transfer fluid can be lost when the connector is disconnected. In dripless connectors, the leakage is limited to one drop or less.

The installation of the battery module can be further simplified when both the fluid inlet connector and the fluid outlet connector are push-to connect connectors, in particular when the fluid inlet connector and the fluid outlet connector are oriented in parallel with respect to each other.

In this case, the battery module can be connected to the thermal management system and can at the same time be mounted to the aircraft in a very simple manner by sliding the module on a mounting bracket fixed to the vehicle in which also the two counter-connectors corresponding to the fluid inlet connector and the fluid outlet connector are integrated. In this manner, no extra step is required for connecting the module to the fluid lines of a thermal management system.

According to a particular embodiment, the housing comprises a tube-like enclosure and two end plates closing a front opening and a back-opening of the tube-like enclosure. In particular, the housing may be formed in one piece, preferably from a combination of at least a heat insulating material and at least a composite material. In this manner, the housing may be light-weight, yet structurally stable and heat resistant. Furthermore, the fluid inlet connector and the fluid outlet connector may be each molded into or attached to one of the end plates and may be preferably both molded into or attached to the same end plate.

In particular, the fluid inlet connector and the fluid outlet connector can each be molded into or attached to one of the end plates in such a manner that they are accessible from a peripheral side of the housing. This design is especially suitable if several modules are arranged in a row along the axial direction of the enclosures for example along an interior wall of the vehicle. A connection direction of the fluid inlet connector and the fluid outlet connector, in particular in the case of push-to connect-connectors, may be perpendicular to the stacking direction and may in particular be horizontal.

In order to implement this design, the fluid inlet connector and the fluid outlet connector can be provided in an interface portion of a peripheral wall of the corresponding end plate into which they are molded, wherein the tube-like enclosure is fitted over and fixed to the end plates and a front edge and/or back edge of the tube-like enclosure comprises a recessed portion aligned with the interface portion so that the interface portion is exposed when the tube-like enclosure is fixed to the end plates.

According to an exemplary embodiment, the end plate further comprises a vent channel with a pressure relief device such as a burst disk provided therein, the vent channel comprising a vent outlet or vent connector arranged in the interface portion, preferably between the fluid inlet connector and the fluid outlet connector in order to limit peak pressure and allow for a controlled release of pressure from the module in case of an emergency such as thermal runaway.

In order to prevent a failure from propagating to other battery modules, the battery module can be configured to shut off a flow of heat transfer fluid into and out of the battery module in case of a thermal runaway of the battery module, for example by using an intumescent material closing the fluid inlet connector and the fluid outlet connector or parts of the internal channel system connected to the fluid inlet connector and the fluid outlet connector if the temperature within the battery module exceeds a given threshold. Alternatively, a suitable valve arrangement can be provided in the battery module, in particular in the connector(s). By shutting off the flow of heat transfer fluid in case of an emergency, also a cross-contamination of fluid can be prevented For tab cooling, the internal channel system can be thermally connected to cell tabs of the cell stack, in particular by way of a thermal paste or a thermal pad. Nevertheless, the invention also applies to other cooling mechanisms such as air cooling or solutions using cold plates.

The internal channel system is preferably made from an electrically insulating material such as PEEK or another polymer and comprises or is configured from a tube or from tubes having a wall thickness sufficiently thin so that the wall does not add significant thermal resistance. The wall thickness can be less than 0.1 mm, preferably less than 0.05 mm.

Alternatively, an array of parallel microtubes can be used, each microtube having a diameter of 0.5 to 3 mm, preferably of about 1 mm. Such microtubes can tolerate high pressures and high temperatures.

Furthermore, it is intended to claim protection for a vehicle, in particular for an aircraft, with a battery system comprising a plurality of battery modules and a thermal management system circulating a heat transfer fluid through the battery modules, wherein at least several, preferably all battery modules are modules according to the invention as described above.

When a heat transfer fluid is directed through an arrangement of several battery modules connected in series to a thermal management system, the temperature of the heat transfer fluid will change with the number of modules the fluid has passed. Therefore, in order to ensure that the battery modules are cooled or heated in a homogeneous manner, at least several, preferably all battery modules are connected in parallel to the thermal management system.

According to an exemplary embodiment, the vehicle comprises an arrangement of mounting brackets fixed to a vehicle frame, each mounting bracket being configured to be connected to a corresponding battery module and comprising counterpart connectors for the fluid inlet and outlet connectors of the corresponding battery module. In particular, as explained above, the mounting bracket and the battery module can be designed in such a manner, that the battery module can be positioned on the aircraft and at the same time be connected to the thermal management system by sliding the battery module on the bracket, the arrangement of brackets on the vehicle forming a mounting rack. Hoses or pipes for carrying heat transfer fluid to or from the thermal management system are routed through the aircraft and are connected to the counter-connectors provided on the mounting brackets.

In particular, also the thermal management system can be configured to cut off a flow of heat transfer fluid to any battery module in case of a thermal runaway of the battery module in the same manner as explained above for the battery module.

Overall, according to the invention, the battery system can be optimized for modularity and maintenance.

FIG. 4 is a simplified cross-sectional view of a part of the battery module from FIG. 1 illustrating schematically in subsets a) and b) how the channel system of the battery module can be thermally coupled to the cell tabs.

FIG. 5 illustrates an embodiment of an aircraft according to the invention in a simplified manner.

Figure 1:
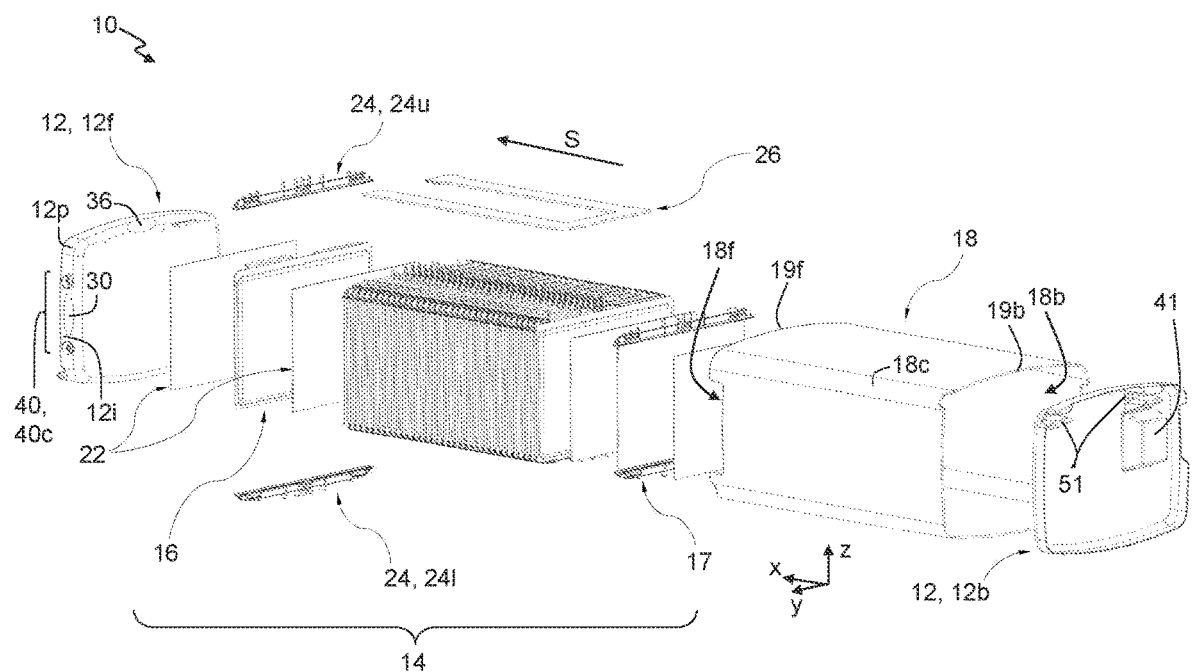
FIG. 1 is an exploded perspective view of a battery module according to an embodiment of the invention.
Figure 2:
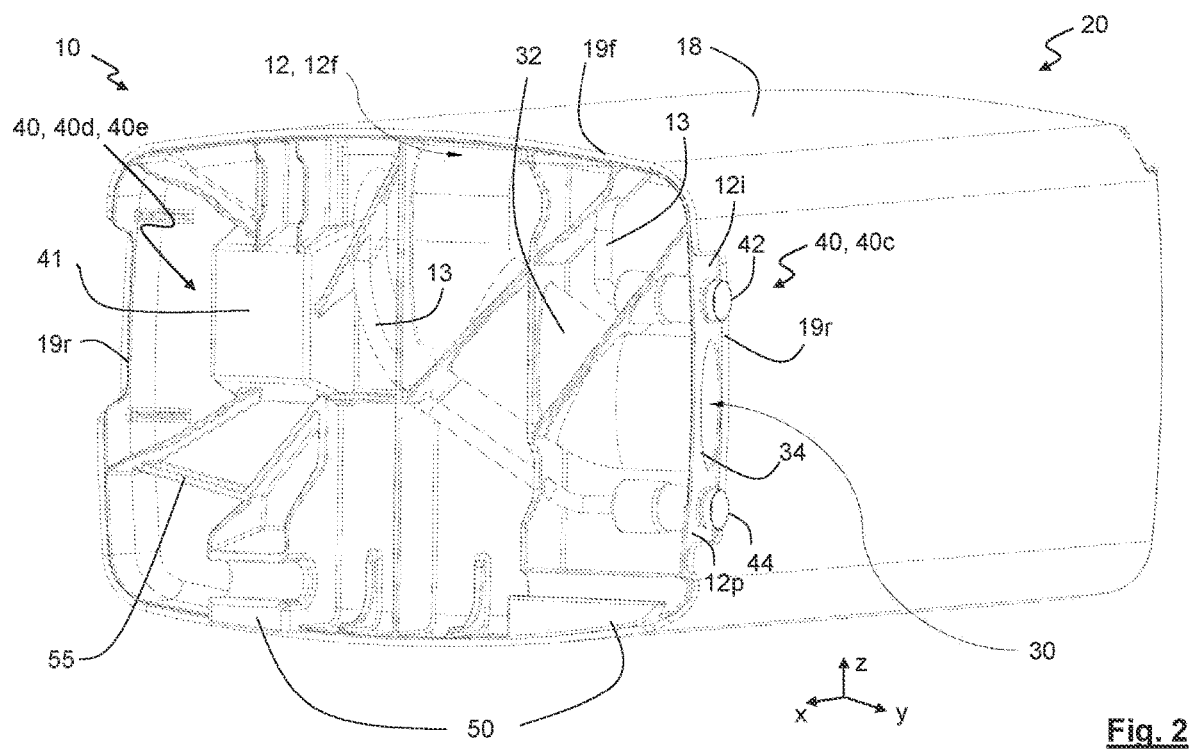
FIG. 2 is a perspective view of the battery module of FIG. 1 in an assembled state.
Figure 3:
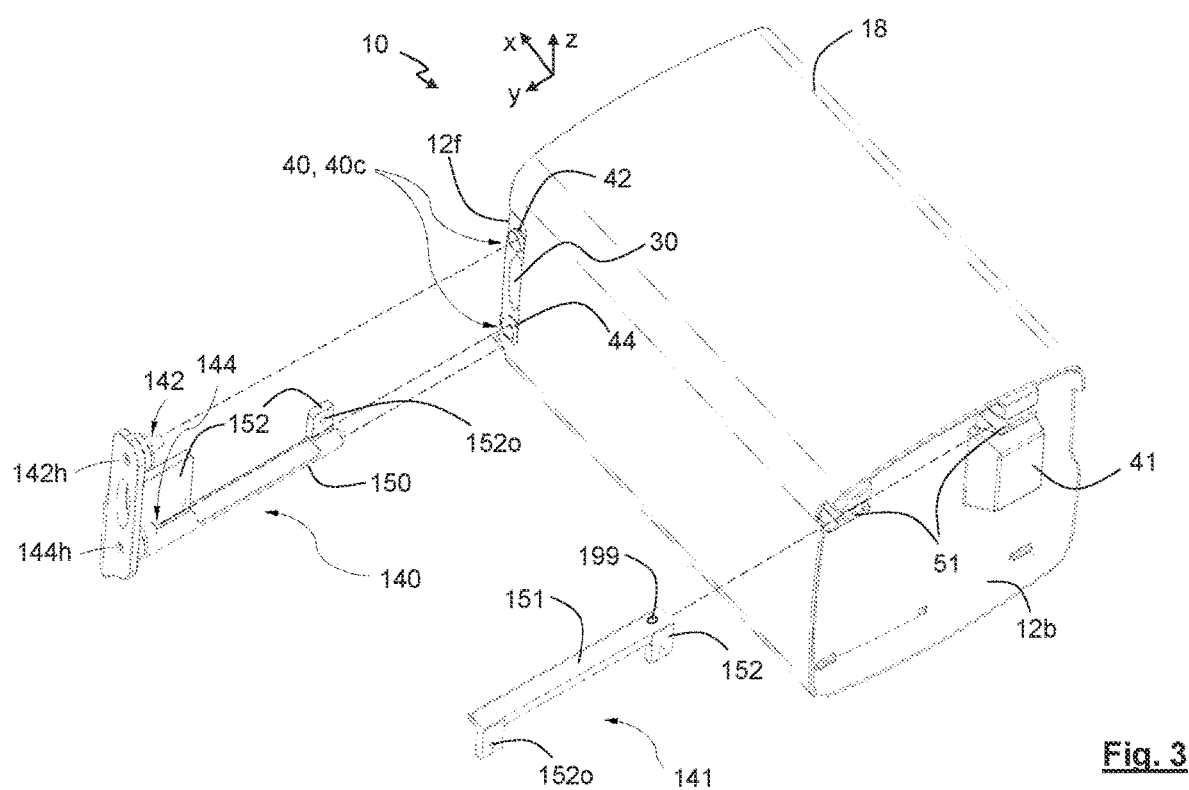
FIG. 3 is another perspective view of the battery module of FIG. 2 and illustrates how the battery module is fixed to mounting brackets.

In FIGS. 1 to 3, a longitudinal direction of the battery module 10 is denoted by x, a lateral direction by y and a vertical direction b z, the directions relating to a battery module in a normal installation position in a vehicle standing on a horizontal ground.

The battery module 10 illustrated in FIG. 1 comprises a cell stack 14 which is accommodated within a housing 20 formed from a tube-like enclosure 18, a front end plate 12$f$ and a back end plate 12$b$, the two end plates closing a front opening 18$f$ and a back opening 18$b$ of the enclosure.

The longitudinal or axial direction x of the enclosure 18 coincides with the stacking direction S of the cell stack 16 comprising an arrangement of alternately provided battery units 17 and foam pads 22 arranged in a row along the stacking direction S between the two end plates 12.

In the illustrated embodiment, each of the battery units 17 comprises a battery cell 16 and a corresponding cell frame 24 which, in the present example, is configured from an upper frame part 24$u$ and a lower frame part 24$l$.

The battery cells 16 are rectangular Li-ion pouch cells with two cell tabs 15 both provided on the upper side of the respective cell.

For tab cooling and/or heating, a rather flat, U-shaped internal channel system 26 can be provided on the upper side of the cell stack 14 so that it is in thermal contact with the cell tabs 15. In order to ensure this thermal contact, a thermal paste 27 (cf. FIG. 4$a$) or a thermal pad 28 (cf. FIG. 4$b$) can be used, depending on the form of the channels 26$c$ of the channel system 26.

The internal channel system 26 is connected at both ends to a fluid connector arrangement 40$c$ for connecting the battery module 10 to an external thermal management system. The fluid connector arrangement 40$c$ is described below in more detail with respect to FIG. 2.

The enclosure 18 has a rectangular cross-section with rounded corners 18$c$ to optimize the trade-off between volume packing efficiency and pressure resistance of the resulting housing 20.

Furthermore, the enclosure 18 is made in one piece from a light-weight yet structurally stable and heat resistant material, in particular from a combination of at least a composite material such as a glass-fiber reinforced polymer and at least a heat insulating material.

In particular, the enclosure can have a layered structure comprising a fiber-reinforced composite layer and a heat insulating, preferably intumescent, coating. Optionally, also a metallic mesh can be provided in the enclosure.

The structure and composition of the housing as a combination of composite materials and insulation materials helps to contain the elevated thermal runaway temperatures and pressures, the walls of the housing acting as fire walls preventing damage and propagation of the reaction to other modules or parts of the vehicle in which the module is installed.

The end plates can comprise a composite material and can in particular be made from a material similar or identical to that of the enclosure.

FIG. 2 shows the battery module 10 in an assembled state and shows in particular the front plate 12$f$ in more detail.

Two fluid lines 13 are embedded into the front plate 12$f$ for connecting the internal channel system 26 to a fluid inlet connector 42 and a fluid outlet connector 44 of the fluid connector arrangement 40$c$. According to the invention, the fluid connectors 42, 44 are self-sealing connectors, in particular dripless, push-to connect connectors that are arranged in parallel which allows the module 10 to be connected and disconnected in a simple manner without interfering with other modules or requiring to drain down the system.

Between the fluid connectors 42 and 44, a pressure relief safety device 30 in the form of a burst disk is provided. The pressure relief safety device 30 is arranged in a vent outlet 34 of a vent channel 32 embedded in the front plate 12$t$ and connected to a vent inlet 36 arranged on a back side of the front plate 12$f$ that is shown in FIG. 1.

If, in the case of a thermal runaway, the pressure inside the housing 20 exceeds a given threshold, the pressure relief safety device 30 opens, so that the pressurized gas can leave the battery module 10 in a controlled manner. The vent outlet 34 can be connected to an external venting system (not shown).

The fluid connectors 42 and 44 as well as the pressure relief safety device 30 are arranged in an interface portion 12$i$ of a peripheral wall 12$p$ or, to be more precise, a right side wall of the front end plate 12$f$ in FIG. 2. The interface portion 12$i$ is aligned with a recessed portion 19$r$ of a front edge 19$f$ defining the front opening 18$f$ of the enclosure 18, so that the interface portion 12*i* is exposed and the fluid connectors 42, 44 and the pressure relief safety device 30 can be accessed from the side along the lateral direction y after the end plates 12 have been fixed to the enclosure 18.

Furthermore, an electrical connector arrangement 40*e* and/or data connector arrangement 40*d* can be provided in the front end plate 12*f* and accommodated in a connector housing 41 so that the electrical connector arrangement 40*e* and/or data connector arrangement 40*d* on the one hand and the fluid connector arrangement 40*c* on the other hand are accessible from opposed sides of the module 10 which reduces the risk of damaging the electronic components of the battery module 10 by contact with the heat transfer fluid which can in particular be water.

In addition, the front end plate 12*f* can comprise an arrangement of reinforcement ribs 55 for increasing the stability and holding the different elements of the front end plate 12*f* in place.

Preferably, the reinforcement ribs 55, the connector housing 41 and a guide rail 51 described below are formed in one piece with the front end plate 12*f* from a plastic or composite material.

As shown in FIG. 2 and illustrated in more detail in FIG. 3, in order to position and fix the battery module 10 on a vehicle, a guide rail 50 for a cylindrical mounting pin 150 of an external mounting bracket 140 can be provided in a the front end plate 12*f*, e.g. in a lower part thereof and a similar guide rail 51 for a mounting plate 151 of a further mounting bracket 141 can be provided in the back end plate 12*b*, e.g. in an upper part thereof.

The mounting brackets 140, 141 can comprise fastening plates 152 with holes 152*o* through which suitable fasteners can be passed in order to fix each mounting bracket 140, 141 to a corresponding mounting structure (not shown) provided on the air craft fuselage.

In order to fix the mounting plate 151 to the back end plate 12*b*, for example a simple R-pin (not shown) can be inserted through a hole 199 provided in a distal end portion of mounting plate 151 inserted in and protruding beyond the guide rail 51.

The mounting bracket 140 furthermore comprises self-sealing and preferably dripless push-to connect counter-connectors 142, 144 adapted to be coupled with the fluid connectors 42, 44 provided on the battery module.

The guide rails 50, 51 and the push-to connect fluid connectors 42, 44 are oriented in parallel to each other, in the present example along the y-direction so that the battery module 10 can be attached to the vehicle and connected to the thermal management system at the same time by sliding the battery module onto the corresponding mounting brackets along that direction.

As the cylindrical mounting pin 150 is very precise, the connection between the fluid connectors 42, 44 and the corresponding counter-connectors 142, 144 can be correctly performed. Then, all tolerance stack up is compensated by the play between mounting plate 151 and the corresponding guide rail 51 on the back side of the battery module 10. Additionally, the counter-connectors 142, 144 provided on the mounting bracket 140 can have floating capabilities to compensate for tolerances.

Furthermore, the rotational degree of freedom between the cylindrical mounting pin 150 and the corresponding guide rail 50 and the play between mounting plate 151 and guide rail 51 serve to isolate the module from bending modes of the fuselage when subjected to flight loads, in this case, bending and shear deformation of the fuselage structure.

Finally, FIG. 5 illustrates in a heavily simplified and schematized manner an aircraft 101 as a vehicle 100 according to an embodiment of the invention, the aircraft 101 comprising a battery system 110 with a plurality of battery modules 10 as described above and a thermal management system 120 adapted to circulate a heat transfer fluid through the battery modules 10 in order to control the temperature of the battery cells therein. Preferable, the thermal management system is adapted to circulate the heat transfer fluid through the battery modules with a pressure between 1 to 2 bar, in particular with a pressure of about 1.5 bar.

It is noted that the number and arrangement of the battery modules in FIG. 5 is chosen purely for illustrative purposes in order to explain the invention.

The thermal management system 120 is illustrated in a schematized manner as a simple box and can comprise any suitable arrangement of pumps, heat exchangers and other elements as known from the prior art. It can be used for cooling and/or heating the battery cells and serves to keep them in a desired temperature range for improved safety and performance.

In the illustrated simplified embodiment, the battery modules 10 are all connected in parallel to the thermal management system 120 by way of a fluid input line 122 connected to the fluid inlet connectors 42 of the battery modules 10 and a fluid output line 142 (marked by hatching) connected to the fluid outlet connectors 144.

In other embodiments (not shown), several or all battery packs of an aircraft can be connected in parallel to the thermal management system, each pack comprising several battery modules fluidically connected in parallel within the pack.

The battery modules 10 and/or the thermal management system 120 can be adapted to shut off a flow of heat transfer fluid into and out of any battery in case of a thermal runaway of the respective battery. In particular, an electro-mechanical relay or interconnect system (not shown) can stop the flow of fluid in the event of thermal runaway. Alternatively, an intumescent material can be used at suitable positions.

The invention claimed is:

1. A battery module for a vehicle, the battery module comprising:
   a housing,
   a cell stack accommodated in the housing,
   an internal channel system for heat transfer fluid disposed in the housing, a fluid inlet connector and a fluid outlet connector connected to the internal channel system and adapted to being connected to an external thermal management system,
   wherein the fluid inlet connector and the fluid outlet connector are self-sealing push-to connect connectors molded into the housing,
   wherein the housing comprises a tubular enclosure extending along a longitudinal axis and two end plates closing a front opening and a back-opening at opposed longitudinal ends of the tubular enclosure, wherein the fluid inlet connector and the fluid outlet connector are each molded into one of the end plates and are both molded into the same end plate in such a manner that they are accessible from a peripheral side of the housing in a direction perpendicular to the longitudinal axis, wherein the fluid inlet connector and the fluid outlet connector are oriented in parallel with respect to each other in a direction perpendicular to the longitudinal axis.

2. The battery module according to claim 1, wherein the fluid inlet connector and the fluid outlet connector are provided in an interface portion of a peripheral wall of the corresponding end plate into which they are molded, the peripheral wall being parallel to the longitudinal direction, wherein the tubular enclosure is fitted over and fixed to the end plates and a front edge and/or back edge of the tubular enclosure comprises a recessed portion that is recessed in the longitudinal direction and aligned with the interface portion so that the interface portion is exposed when the tubular enclosure is fitted over and fixed to the corresponding end plate.

3. The battery module according to claim 2, wherein the end plate further comprises a vent channel with a pressure relief device provided therein, the vent channel comprising a vent outlet or vent connector arranged in the interface portion between the fluid inlet connector and the fluid outlet connector.

4. The battery module according to claim 1, wherein the internal channel system is thermally connected to cell tabs of the cell stack, by way of a thermal paste or a thermal pad.

5. The battery module according to claim 1, wherein the internal channel system is made from an electrically insulating material and comprises or is configured from a tube or from tubes having a wall thickness of less than 0.1 mm, and/or from an array of parallel microtubes, each microtube having a diameter of 0.5 to 3 mm.

6. A vehicle with a battery system comprising:
a plurality of battery modules and a thermal management system circulating a heat transfer fluid through the battery modules, wherein at least several of the plurality of battery modules are modules comprising:
a housing,
a cell stack accommodated in the housing,
an internal channel system for heat transfer fluid disposed in the housing,
a fluid inlet connector and a fluid outlet connector connected to the internal channel system and connected to the thermal management system,
wherein the fluid inlet connector and the fluid outlet connector are self- sealing push-to connect connectors molded into the housing,
wherein the housing comprises a tubular enclosure extending along a longitudinal axis and two end plates closing a front opening and a back-opening at opposed longitudinal ends of the tubular enclosure, wherein the fluid inlet connector and the fluid outlet connector are each molded into one of the end plates and are both molded into the same end plate in such a manner that they are accessible from a peripheral side of the housing in a direction perpendicular to the longitudinal axis, wherein the fluid inlet connector and the fluid outlet connector are oriented in parallel with respect to each other in a direction perpendicular to the longitudinal axis.

7. The vehicle according to claim 6, wherein at least several of the plurality of battery modules are connected in parallel to the thermal management system.

8. The vehicle according to claim 6 with battery modules wherein the internal channel system is thermally connected to cell tabs of the cell stack, in particular by way of a thermal paste or a thermal pad, and wherein the internal channel system is made from an electrically insulating material and comprises or is configured from a tube or from tubes having a wall thickness of less than 0.1 mm, and/or from an array of parallel microtubes, each microtube having a diameter of 0.5 to 3 mm, the vehicle comprising an arrangement of mounting brackets fixed to a vehicle frame, each mounting bracket being configured to be connected to a corresponding battery module and comprising counterpart connectors for the fluid inlet and outlet connectors of the corresponding battery module.

9. The vehicle according to claim 6, wherein the thermal management system is configured to cut off a flow of heat transfer fluid to any battery module in case of a thermal runaway of the battery module.

10. The battery module according to claim 1, wherein the battery module is configured to shut off a flow of heat transfer fluid into and out of the battery module in case of a thermal runaway of the battery module by use of an intumescent material closing the fluid inlet connector or the fluid outlet connector or parts of the internal channel system connected to the fluid inlet connector or the fluid outlet connector if the temperature within the battery module exceeds a given threshold, or by use of a valve mechanism closing the fluid inlet connector and the fluid outlet connector if the temperature within the battery module exceeds the given threshold.

11. The battery module according to claim 1, wherein at least one of the plurality of battery modules is configured to shut off a flow of heat transfer fluid into and out of the battery module in case of a thermal runaway of the battery module by use of an intumescent material closing the fluid inlet connector and the fluid outlet connector or parts of the internal channel system connected to the fluid inlet connector or the fluid outlet connector if the temperature within the battery module exceeds a given threshold, or by use of a valve mechanism closing the fluid inlet connector or the fluid outlet connector if the temperature within the battery module exceeds the given threshold.

\* \* \* \* \*